US009558781B1

(12) United States Patent
Fordham et al.

(10) Patent No.: US 9,558,781 B1
(45) Date of Patent: Jan. 31, 2017

(54) METHOD FOR SELECTING INDIVIDUAL DISCS FROM TIGHTLY SPACED ARRAY OF OPTICAL DISCS (71) Applicant: Flextronics AP, LLC., Broomfield, CO (US)

(72) Inventors: Mark Fordham, Chapel Hill, NC (US); Stephen Hancock, Wake Forest, NC (US)

(73) Assignee: Flextronics AP, LLC, Broomfield, CO (US)

( * ) Notice: Subject to any disclaimer, the term of this patent is extended or adjusted under 35 U.S.C. 154(b) by 0 days.

(21) Appl. No.: 14/885,879

(22) Filed: Oct. 16, 2015

Related U.S. Application Data (60) Provisional application No. 62/064,807, filed on Oct. 16, 2014.

(51) Int. Cl.
*G11B 17/26* (2006.01)
*G11B 17/24* (2006.01)
G11B 17/28 (2006.01)
G11B 17/22 (2006.01)

(52) U.S. Cl.
CPC ............. *G11B 17/26* (2013.01); *G11B 17/24* (2013.01); *G11B 17/223* (2013.01); *G11B 17/28* (2013.01)

(58) Field of Classification Search
USPC ................. 369/30.91–30.93; 720/614–615
See application file for complete search history.

(56) References Cited

U.S. PATENT DOCUMENTS

| 4,476,606 | A | 10/1984 | Bjorkman et al. |
| 4,542,924 | A | 9/1985 | Brown et al. |
| 4,557,382 | A | 12/1985 | Johnson |
| 4,588,086 | A | 5/1986 | Coe |
| 4,702,369 | A | 10/1987 | Philosophe |
| 4,712,679 | A | 12/1987 | Lowe |
| 4,747,488 | A | 5/1988 | Kikuchi |
| 4,779,732 | A | 10/1988 | Boehm |
| 4,850,477 | A | 7/1989 | Gelardi |
| RE33,361 | E | 10/1990 | Coe |
| 5,046,615 | A | 9/1991 | Nentl |
| D335,215 | S | 5/1993 | Stumpff |
| 5,474,170 | A | 12/1995 | Erickson |
| 5,485,436 | A | 1/1996 | Forget |
| 5,508,994 | A * | 4/1996 | Nakamichi .......... G11B 17/223 369/30.77 |

(Continued)

Primary Examiner — Carlos E Garcia
(74) Attorney, Agent, or Firm — Haverstock & Owens LLP (57) ABSTRACT A cylindrical array of tightly spaced optical discs are each positioned vertically on edge to form a horizontal stack. Lifting a subset of optical discs enables that subset of optical discs to be grasped by their perimeters with much more room for robotic grippers between adjacent optical discs. An optical disc storage container includes a molded tray for vertically aligning a plurality of optical discs into the cylindrical array. The molded tray includes a bottom surface and side surfaces to support the optical discs and one or more openings formed in the bottom surface. A lifting mechanism is positioned along the one or more openings and is configured to lift the subset of optical discs a short distance relative to the remaining optical discs in the array, thereby enabling robotic grippers to grab the portion of the lifted optical disc protruding from the non-lifted optical disc array.

13 Claims, 5 Drawing Sheets (56) References Cited

U.S. PATENT DOCUMENTS

| | | | |
|---|---|---|---|
| 5,528,442 A * | 6/1996 | Hisatomi | G11B 17/223 369/30.91 |
| 5,548,567 A * | 8/1996 | Sawai | G11B 33/08 360/98.05 |
| 5,682,291 A | 10/1997 | Jefferies et al. | |
| 5,704,494 A | 1/1998 | Nishikiori | |
| 5,706,946 A | 1/1998 | Kakizaki | |
| 5,765,707 A | 6/1998 | Kenevan | |
| 5,793,717 A | 8/1998 | Moita | |
| 5,808,976 A * | 9/1998 | Hisatomi | G11B 17/223 369/30.77 |
| 5,823,332 A | 10/1998 | Clausen | |
| 5,921,397 A | 7/1999 | Whalen | |
| 5,946,061 A | 8/1999 | Kurihara et al. | |
| 5,959,958 A * | 9/1999 | Inatani | G11B 17/28 369/30.85 |
| 6,002,658 A | 12/1999 | Aso et al. | |
| 6,134,212 A * | 10/2000 | Pines | G11B 17/28 369/30.85 |
| 6,151,207 A | 11/2000 | Kim | |
| 6,310,769 B1 | 10/2001 | Johnson et al. | |
| 6,371,321 B1 | 4/2002 | Lee | |
| 6,377,447 B1 | 4/2002 | Boe | |
| 6,377,449 B1 | 4/2002 | Liao et al. | |
| 6,411,501 B1 | 6/2002 | Cho et al. | |
| 6,501,641 B1 | 12/2002 | Kim et al. | |
| 6,560,092 B2 | 5/2003 | Itou et al. | |
| 6,590,848 B1 | 7/2003 | Chen | |
| 6,614,654 B2 | 9/2003 | Liu et al. | |
| 6,619,766 B1 | 9/2003 | Mansueto | |
| 6,652,314 B2 | 11/2003 | Tournadre | |
| 6,661,652 B2 | 12/2003 | Worden et al. | |
| 6,728,109 B1 | 4/2004 | Wu | |
| 6,813,148 B2 | 11/2004 | Hsu et al. | |
| 6,813,159 B2 | 11/2004 | Irie et al. | |
| 6,859,357 B2 | 2/2005 | Morimoto et al. | |
| 7,035,099 B2 | 4/2006 | Wu | |
| 7,036,783 B2 | 5/2006 | Chen et al. | |
| 7,075,783 B2 | 7/2006 | Jeong et al. | |
| 7,079,380 B2 | 7/2006 | Wubs | |
| 7,085,131 B2 | 8/2006 | Peng et al. | |
| 7,102,885 B2 | 9/2006 | Chen et al. | |
| 7,130,187 B1 | 10/2006 | Sun | |
| 7,142,419 B2 | 11/2006 | Cochrane | |
| 7,187,541 B2 | 3/2007 | Franke et al. | |
| 7,218,512 B2 | 5/2007 | Han | |
| 7,267,313 B2 | 9/2007 | Kroska et al. | |
| 7,274,560 B2 | 9/2007 | Jeong et al. | |
| 7,298,624 B2 | 11/2007 | Boswell et al. | |
| 7,301,762 B2 | 11/2007 | Han | |
| 7,304,837 B2 | 12/2007 | Lo et al. | |
| 7,352,569 B2 | 4/2008 | Muenzer et al. | |
| 7,379,294 B2 | 5/2008 | Chen | |
| 7,431,158 B2 | 10/2008 | Yamada | |
| 7,450,375 B2 | 11/2008 | Xu | |
| 7,463,490 B2 | 12/2008 | Kim et al. | |
| 7,483,268 B1 | 1/2009 | King et al. | |
| 7,486,509 B2 | 2/2009 | Kim et al. | |
| 7,545,629 B1 | 6/2009 | Bauer, Jr. et al. | |
| 7,558,054 B1 | 7/2009 | Prest et al. | |
| 7,609,509 B2 | 10/2009 | Wa et al. | |
| 7,743,938 B2 | 6/2010 | Wu | |
| 7,889,492 B2 | 2/2011 | Chen et al. | |
| 2002/0043608 A1 | 4/2002 | Nakata et al. | |
| 2002/0044416 A1 | 4/2002 | Harmon, III et al. | |
| 2002/0044418 A1 | 4/2002 | Shih | |
| 2002/0067592 A1 | 6/2002 | Horiuchi et al. | |
| 2003/0035281 A1 | 2/2003 | Huang et al. | |
| 2003/0046849 A1 | 3/2003 | Lin | |
| 2003/0222555 A1 | 12/2003 | Mansueto | |
| 2004/0032711 A1 | 2/2004 | Kaczeus, Sr. et al. | |
| 2004/0052192 A1 | 3/2004 | Chen | |
| 2004/0075978 A1 | 4/2004 | Chen et al. | |
| 2004/0105229 A1 | 6/2004 | Wang et al. | |
| 2005/0039995 A1 | 2/2005 | Inoke et al. | |
| 2005/0040306 A1 | 2/2005 | Chen et al. | |
| 2005/0087504 A1 | 4/2005 | Wu | |
| 2005/0094367 A1 | 5/2005 | Franke et al. | |
| 2005/0099767 A1 | 5/2005 | Wu | |
| 2005/0103729 A1 | 5/2005 | Chen et al. | |
| 2005/0237709 A1 | 10/2005 | Huang | |
| 2006/0023416 A1 | 2/2006 | Chen | |
| 2006/0061954 A1 | 3/2006 | Lam | |
| 2006/0158860 A1 | 7/2006 | Green et al. | |
| 2007/0030639 A1 | 2/2007 | Ko | |
| 2007/0201320 A1 * | 8/2007 | Suzuki | G11B 17/021 369/30.78 |
| 2007/0251896 A1 | 11/2007 | Lau | |
| 2008/0019084 A1 | 1/2008 | Lee et al. | |
| 2008/0037212 A1 | 2/2008 | Wang | |
| 2008/0101006 A1 | 5/2008 | Tsorng et al. | |
| 2008/0165487 A1 | 7/2008 | Tsorng et al. | |
| 2008/0291618 A1 | 11/2008 | Sheng | |
| 2008/0291619 A1 | 11/2008 | Fan et al. | |
| 2009/0073649 A1 | 3/2009 | Ikeda et al. | |
| 2009/0190142 A1 | 7/2009 | Taylor | |
| 2009/0279244 A1 | 11/2009 | Crippen et al. | |
| 2011/0119693 A1 * | 5/2011 | Takasawa | G11B 17/223 720/732 |
| 2011/0128696 A1 | 6/2011 | Weng | |
| 2015/0194180 A1 * | 7/2015 | Morioka | G11B 17/26 720/623 |

* cited by examiner

METHOD FOR SELECTING INDIVIDUAL DISCS FROM TIGHTLY SPACED ARRAY OF OPTICAL DISCS

CROSS-REFERENCE TO RELATED APPLICATION(S)

This application claims priority under 35 U.S.C. §119(e) of the U.S. Provisional Patent Application Ser. No. 62/064,807, filed Oct. 16, 2014 and titled, "METHOD FOR SELECTING INDIVIDUAL DISCS FROM TIGHTLY SPACED ARRAY OF OPTICAL DISCS," which is hereby incorporated by reference in its entirety for all purposes.

FIELD OF THE INVENTION

The present invention relates to the field of optical disc storage and access. More specifically, the present invention relates to the system and method of selecting individual optical discs from a tightly spaced array of optical discs.

BACKGROUND OF THE INVENTION

Optical discs provide a reliable long term storage medium available for digital information. In order to automate archived optical disc storage in a cost effective manner, optical discs are shelved for occasional automated retrieval. One method of storage is to place the optical discs in drawers where subgroups of optical discs can be accessed. However, an amount of empty space equal to or greater than the useable length of the drawer must be reserved for the drawer to slide open and the optical discs retrieved. In archival storage of optical discs it is desirable to minimize unused space in such storage configurations.

In addition to minimizing the amount of empty space needed for optical disc retrieval, it is also desired to minimize the amount of space that the optical discs themselves occupy so as to maximize optical disc storage density. As such, optical discs are stacked as closely together as possible. A problem with closely stacking optical discs is the subsequent process of accessing a specific optical disc within a tightly spaced optical disc stack. One technique of accessing a specific optical disc within an optical disc stack is to use a robotic gripper. The specific optical disc is accessed by moving the robotic gripper a determined distance within the optical disc stack based on an anticipated average thickness of each optical disc. However, variances in manufacturing tolerances for optical disc thicknesses results in inaccurate determination of a specific optical disc position within an optical disc stack.

SUMMARY OF THE INVENTION

A cylindrical array of tightly spaced optical discs are arranged such that all optical discs share the same access of symmetry. Lifting a subset of optical discs, for example every other optical disc in a stack of optical discs, every third optical disc in the stack, every fourth optical disc in the stack, etc., enables that subset of optical discs to be grasped by their perimeters with much more room for robotic grippers between adjacent optical discs. There are multiple configurations for lifting a subset of discs to protrude above the remaining optical discs with sufficient spacing between adjacent optical discs for robotic grippers. In some embodiments, an optical disc storage container comprises a molded tray for vertically aligning a plurality of optical discs into the cylindrical array. The molded tray includes a bottom surface and side surfaces to support the optical discs and one or more openings formed in the bottom surface along a horizontal axis of the tray. A lifting mechanism is positioned along the one or more openings and is configured to lift the subset of optical discs a short distance relative to the remaining optical discs in the array. A lifted optical disc is lifted a sufficient distance so as to enable robotic grippers to grab the portion of the lifted optical disc protruding from the non-lifted optical disc array.

In an aspect, an optical disc storage and retrieval system is disclosed. The system includes a tray and a lifting mechanism. The tray is configured to store an array of vertically aligned optical discs. The tray comprises a bottom surface and opposing side surfaces configured to support the optical discs, wherein the bottom surface comprises one or more openings. The lifting mechanism is positioned adjacent to the one or more openings, wherein the lifting mechanism is configured to selectively lift a subset of the optical discs in the array such that a portion of each optical disc in the subset protrudes from a non-lifted subset of the optical discs in the array. In some embodiments, the subset of the optical discs comprises one or more non-sequential optical discs in the array. In some embodiments, the subset of optical discs comprises every even numbered optical disc in the array or every odd numbered optical disc in the array. In some embodiments, the subset of optical discs comprises every Nth numbered optical disc in the array, where N is one of an integer greater than one. In some embodiments, the tray comprises one or more cylindrical recesses. In some embodiments, each cylindrical recess comprises a plurality of grooves, each groove structured to receive an optical disc. In some embodiments, the tray further comprises a plurality of lead-ins extending from the bottom surface and opposing side surfaces, wherein the plurality of grooves are formed by the plurality of lead-ins. In some embodiments, the lifting mechanism comprises a lifting probe configured to selectively lift a single optical disc. In some embodiments, the lifting mechanism comprises a comb-like structure having a plurality of rigid bristles, each bristle configured to align with one of the optical discs in the subset. In some embodiments, the lifting mechanism comprises two comb-like structures, a first comb-like structure having a first plurality of rigid bristles configured to align with every even numbered optical disc in the array and a second comb-like structure having a second plurality of rigid bristles configured to align with every odd numbered optical disc in the array, wherein the lifting mechanism selecting engages either the first comb-like structure or the second comb-like structure. In some embodiments, the lifting mechanism comprises a cam shaft having a plurality of cams, each cam configured to align with one of the optical discs in the subset. In some embodiments, the cam shaft comprises two sets of cams, a first set of cams wherein each cam in the first set is configured to align with every even numbered optical disc in the array and a second set of cams wherein each cam in the second set is configured to align with every odd numbered optical disc in the array, wherein the lifting mechanism selecting engages either the first set of cams or the second set of cams. In some embodiments, the system further comprising a robotic gripper configured to selectively grab one of the lifted subset of optical discs.

In another aspect, an optical disc storage device is disclosed. The optical disc storage device includes a tray and a plurality of lead ins. The tray is configured to store an array of vertically aligned optical discs, wherein the tray comprises a bottom surface and opposing side surfaces configured to support the optical discs. The plurality of lead ins extend from the bottom surface and opposing side surfaces, wherein the plurality of lead ins form a plurality of grooves, each groove configured to receive one optical disc. In some embodiments, the bottom surface and a portion of the side surfaces form a cylindrical interior surface. In some embodiments, a remaining portion of the side surfaces form a linear interior surface coupled to the cylindrical interior surface. In some embodiments, each lead in matches a contour of an interior surface of the side surfaces and the bottom surface such that the lead in has a cylindrical contour coincident with the cylindrical interior surface and has a linear contour coincident with the linear interior surface.

Other features and advantages of the present invention will become apparent after reviewing the detailed description of the embodiments set forth below.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE PREFERRED EMBODIMENT

Embodiments of the present application are directed to a method and system for selecting individual optical discs from an optical disc array. Those of ordinary skill in the art will realize that the following detailed description of the method and system is illustrative only and is not intended to be in any way limiting. Other embodiments of the method and system will readily suggest themselves to such skilled persons having the benefit of this disclosure.

Reference will now be made in detail to implementations of the method and system as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
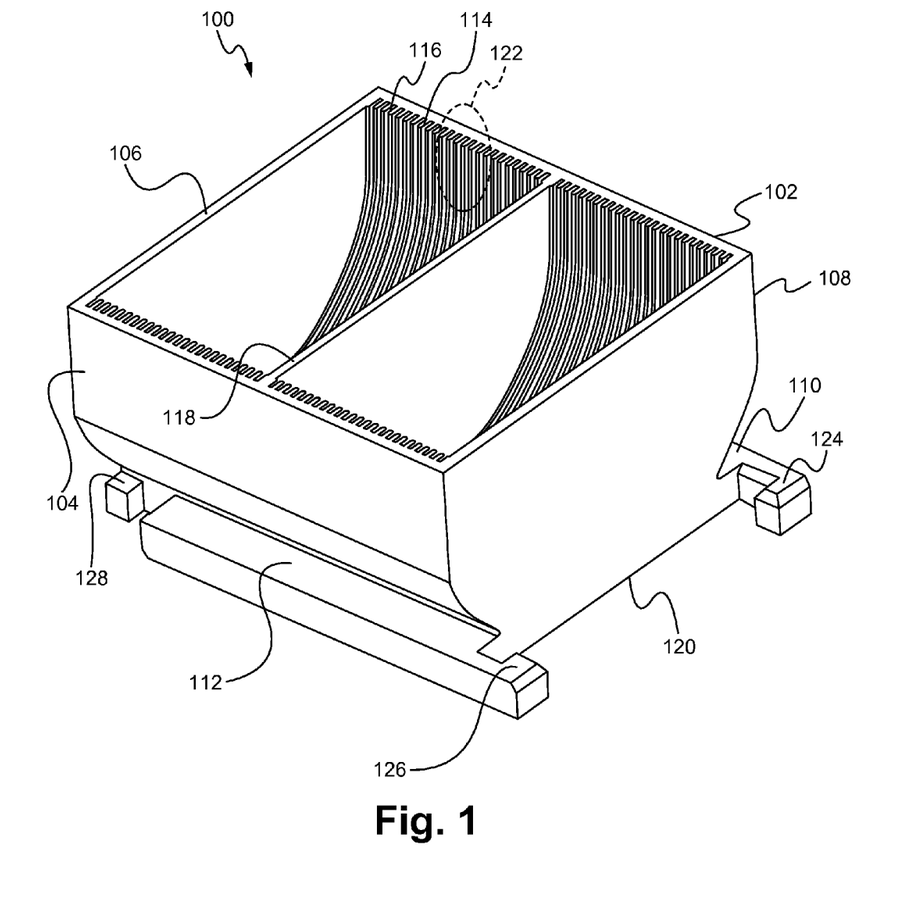
FIG. 1 illustrates a top down perspective view of an optical disc storage device, or tray, according to an embodiment.

FIG. 1 illustrates a top down perspective view of an optical disc storage device, or tray, 100 according to an embodiment. In some embodiments, the tray 100 includes a front wall 108, side walls 102 and 104, a back wall 106 and a bottom wall 120. In some embodiments, a middle wall 118 is included to provide additional structural support. In some embodiments, the tray 100 is plastic molded. In some embodiments, the side walls 102 and 104 and the bottom wall 120 generally have a cylindrical shape within an interior of the tray 100 that substantially matches a circular shape of an optical disc. However, a top most portion, such as at 122, of the side walls 102, 104 is not cylindrical in the interior of the tray 100, and instead is substantially linear. The cylindrical interior portion of tray 100 has a depth substantially equal to one-half of the diameter of the optical disc to be stored. In other words, the cylindrical interior surface has a 180 degree inner circumference. This enables a bottom half of the optical disc to rest along the cylindrical interior surface of the side walls 102, 104 and the bottom wall 120. The liner portion of the interior surface of the side walls 102, 104 extends vertically from point where the cylindrical interior surface ends. Lead-ins 114 extend inward from the interior surface of the side walls 102, 104 and the bottom wall 120 to form grooves 116 into which optical discs are positioned, one optical disc per groove 116. The lead ins 114 match a contour of the interior surface of the side walls 102, 104 and the bottom surface 120 such that the lead ins 114 have a cylindrical contour where the interior surface of the side walls 102, 104 and the bottom wall 120 is cylindrical and have a linear contour where the interior of the side walls 102, 104 are linear. The linear portions of the lead ins 114, such as at area 122, guides the optical disc into its appropriate groove 116 and insures the optical disc rests in the groove 116 such that the center of mass of the optical disc is below the top of the groove. The linear portions of the lead ins 114 also provide stability to the optical disc when it is raised in preparation for being grabbed by a robotic gripper, as described in greater detail below.

The tray 100 also includes a pair of rails 110 and 112 formed on the outside of side walls 102 and 104, respectively. The pair of rails 110, 112 are configured to slide into complimentary slots (not shown) in a storage drawer (not shown), which constrain the tray 100 to move in a single Cartesian direction allowed by the pair of slots. At the front of each tray 100, the rails 110 and 112 protrude beyond the front wall 108 of the tray 100. A hook feature 124 is molded into the protruding portion of the rail 110 and a hook feature 126 is molded into the protruding portion of the rail 112. A finger feature 128 complimentary to a hook feature is molded into a rear portion of each rail 110, 112. The two sets of hook and finger features are designed such that hook and finger features of two separate trays can be meshed together by vertical movement of one tray relative to another. Thus two trays 100 can be interlocked such that their rails form a single continuous assembled rail. Once the interlocking hook and finger features slide into the slots, the two trays cannot be disassembled since the slots do not allow vertical movement. The interlocking structure allows any two trays in any number to be joined or assembled forming a pair of interlocking assembled rails, such that each of the trays can be pulled from the interlocking mechanism to provide access to the tray behind it. Examples of such interlocking trays are further described in the co pending U.S. patent application Ser. No. 14/885,903, entitled "SEPARABLE DRAWER FOR HIGH DENSITY OPTICAL DISC ARCHIVAL STORAGE", which is hereby incorporated in its entirety by reference.

Figure 2:
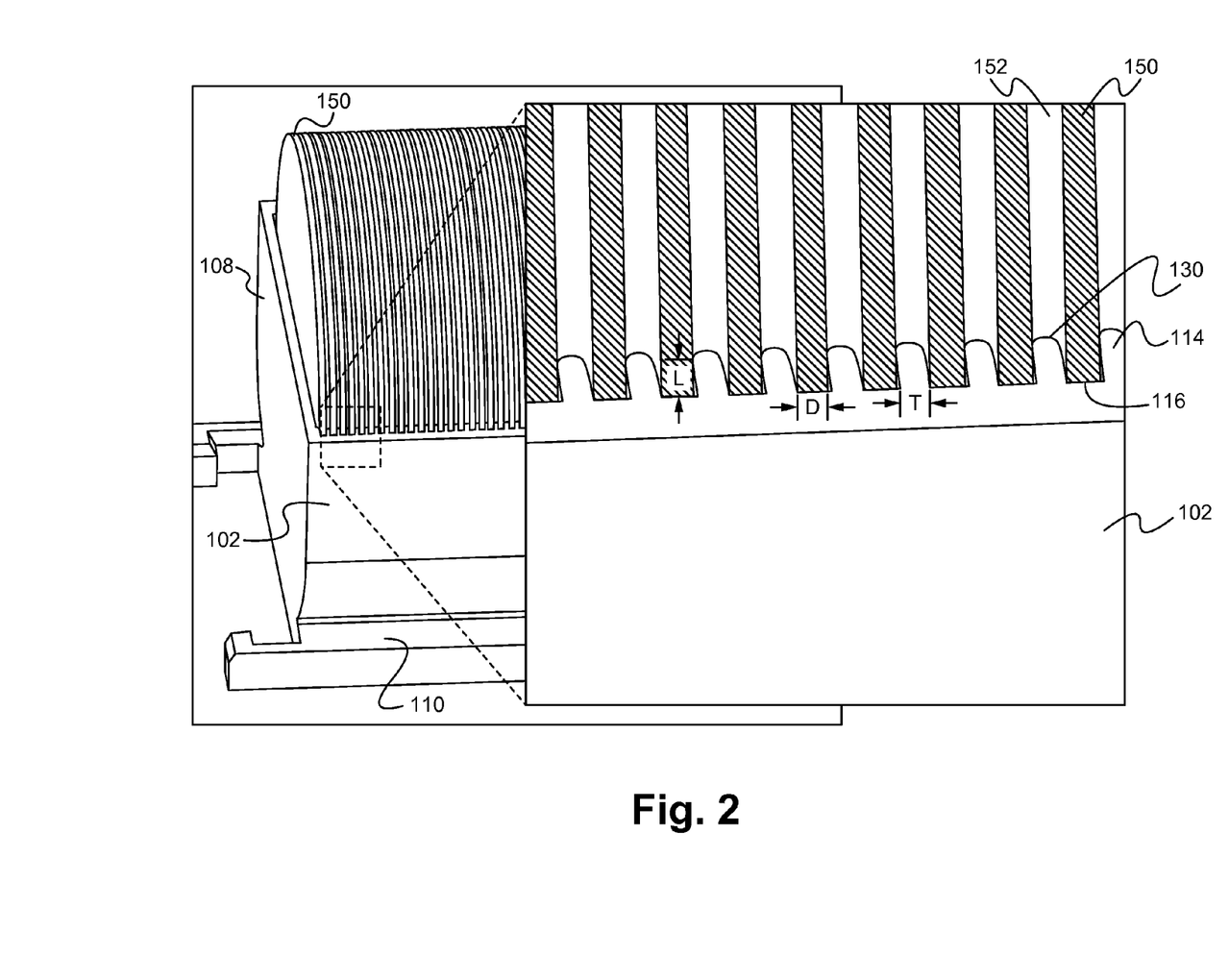
FIG. 2 illustrates a partial side perspective view of the tray loaded with a plurality of optical discs.

FIG. 2 illustrates a partial side perspective view of the tray 100 loaded with a plurality of optical discs 150. FIG. 2 further illustrates a magnified portion of the tray 100 and the plurality of optical discs 150. Each optical disc 150 is positioned in a corresponding groove 116. In this manner, each optical disc 150 is stored vertically, on edge within the groove 116, and the plurality of optical disc 150 form a horizontal stack of vertically aligned optical discs. The portion of each optical disc 150 within the tray 100 rests on edge against the cylindrical interior portion of the tray. Vertical storage of each optical disc 150 minimizes the amount of support needed for each optical disc, in this case the area of the cylindrical interior portion in contact with the optical disc edge. If the optical discs were instead stored horizontally using a similar method of lead ins to separate each adjacent optical disc, then each optical disc would require support along its entire circular area. Without such support each optical disc would sag over time due to gravity. In the vertical storage configuration, gravity does not force a bending moment on the optical disc.

Each lead in 114 has a thickness T that forms an empty space 152 between each adjacent optical disc 150. Each lead in 114 also has a linear length L that extends from the side wall 102 and a curved portion 130. The lead ins 114 are separated by a distance D. The distance D is large enough to allow the optical disc to be loaded into and unloaded out of the groove 116, but small enough to prevent the loaded optical disc 150 from leaning away from a substantially vertical position. In some embodiments, the distance D is substantially equal to a maximum thickness of the optical disc 150 as allowed by manufacturing tolerances. The linear length L of the lead in 116 does not extend into a writeable area of the optical disc 150 so that contact between the optical disc 150 and the sides of the lead ins 114 does not damage a readable area of the optical disc 150. A function of the lead ins 114 is to provide a minimum separation between adjacent optical discs for retrieval by a robotic gripper. Another function of the lead ins 114 is to provide predictable reference points for each optical disc. Still another function of the lead ins 114 is to stabilize the optical discs 150 when loaded in the tray 100.

In some applications, even with the spacing between adjacent optical discs provided by the lead ins it is difficult for some robotic grippers to grab an individual optical disc from within the stack of optical discs loaded in the tray. In some embodiments, the bottom wall of the tray is configured with one or more openings, such as slits, that expose a portion of the loaded optical discs to a lifting mechanism for selectively raising one or more of the optical discs into a raised position above a loaded position within the tray. In the raised position, a raised optical disc is more easily accessible by a robotic gripper, such as for gripping the raised optical disc from the front and back (as referenced in the Y direction).

Figure 3:
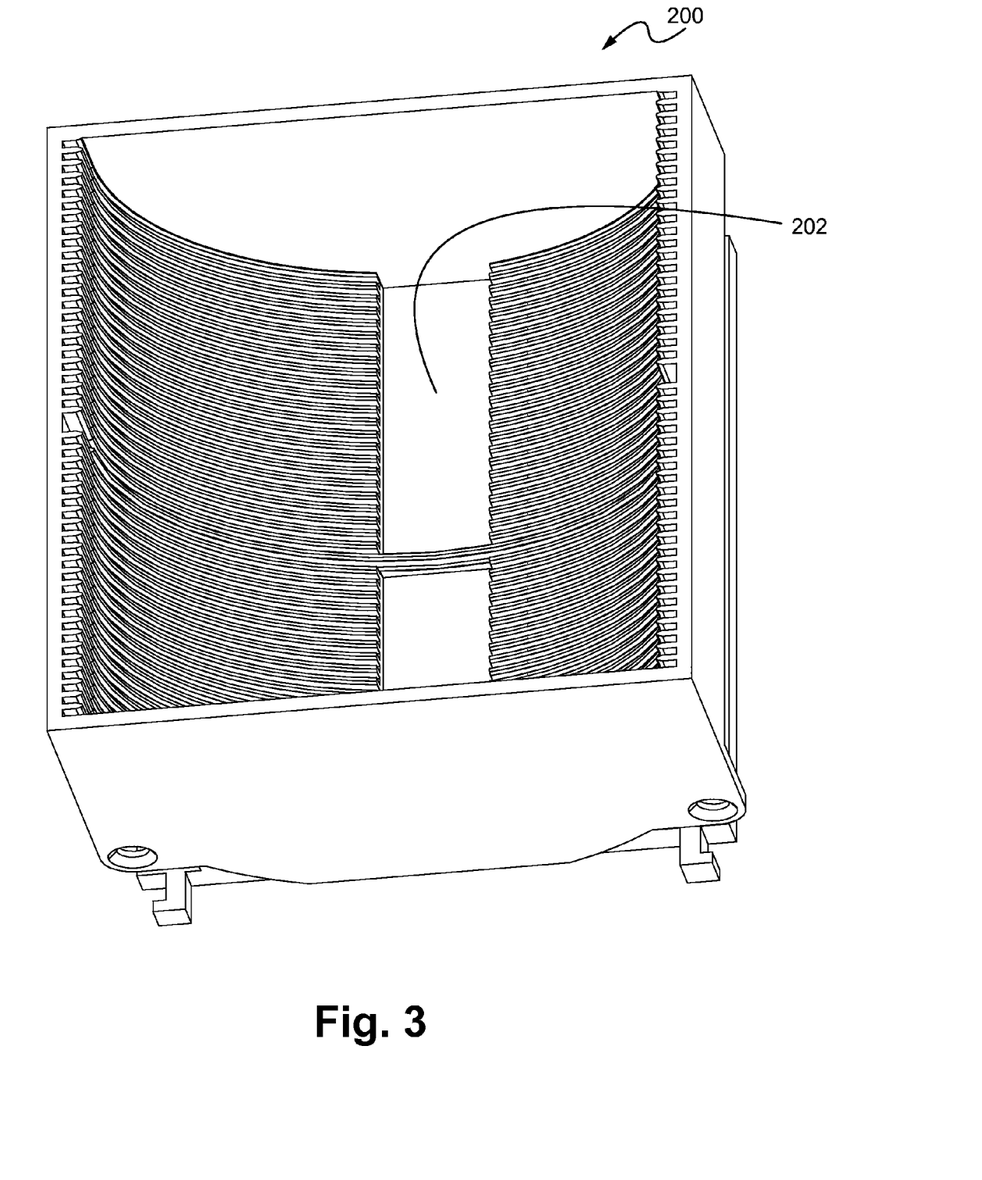
FIG. 3 illustrates a top down perspective view of another optical disc storage device, or tray, according to an embodiment.

FIG. 3 illustrates a top down perspective view of another optical disc storage device, or tray, according to an embodiment. The tray 200 is similar to the tray 100 in FIGS. 1 and 2 with the addition of an opening 202 extending through a bottom wall of the tray 200. In the exemplary configuration shown in FIG. 3, the opening 202 is along a single axis. In alternative configurations, openings can be positioned off center, which are offset from each other. Offset openings provide increased structural integrity compared to the single axis openings in FIG. 3.

Figure 4:
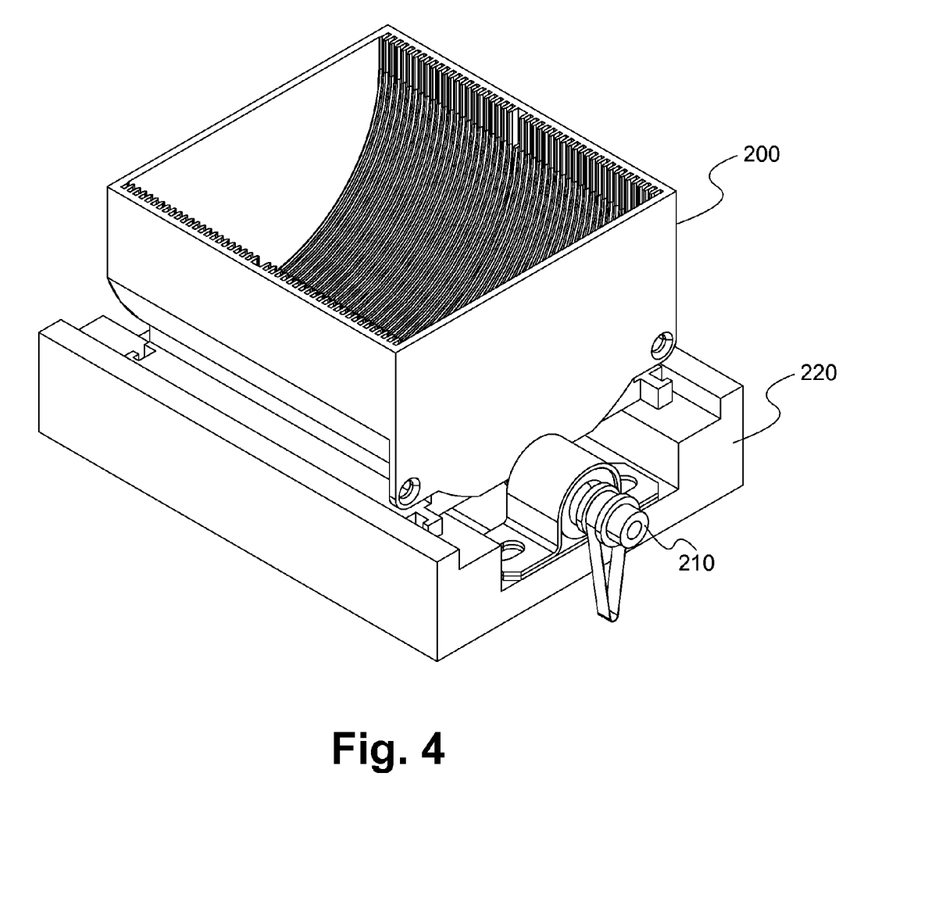
FIG. 4 illustrates a tray and a cam shaft having a plurality of cams according to an embodiment.
Figure 5:
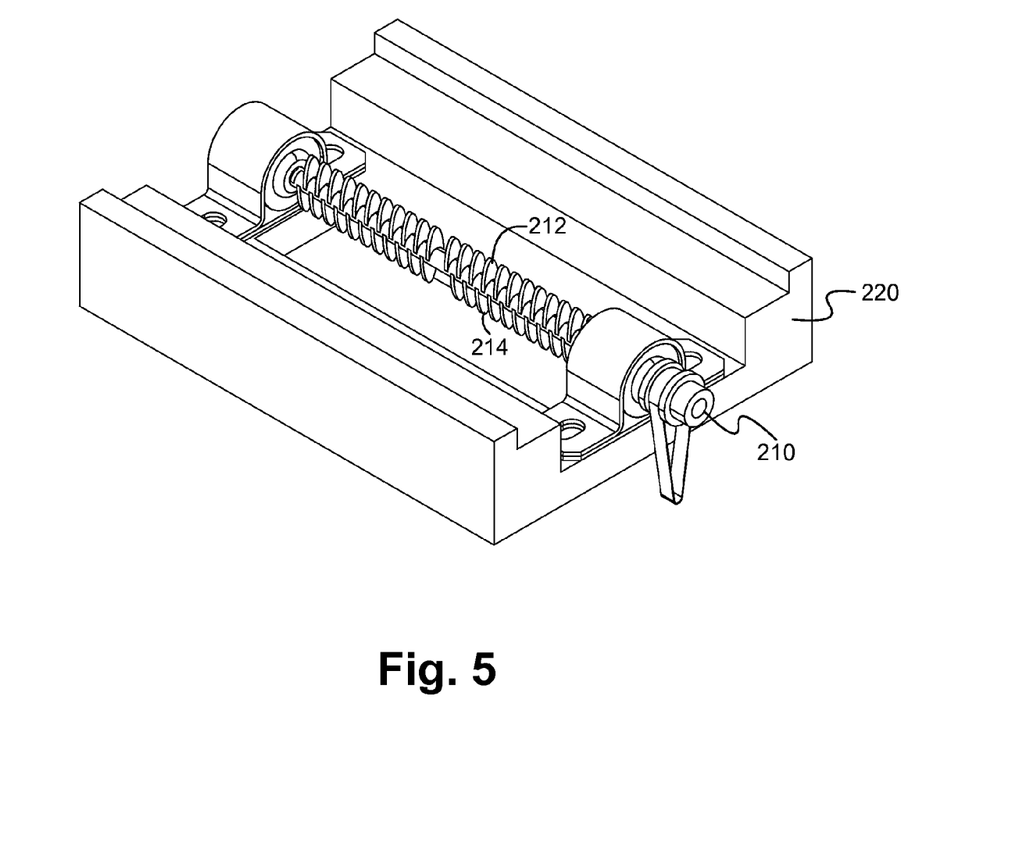
FIG. 5 illustrates the configuration shown in FIG. 4 with the tray removed.

The opening in the bottom of the tray expose a bottom portion of each optical disc edge. A lifting mechanism is positioned under or alongside the tray. The lifting mechanism is configured to selectively raise one or more of the optical discs loaded in the tray by pushing on the exposed optical disc edge. In some embodiments, the lifting mechanism comprises a cam shaft having a plurality of cams. FIG. 4 illustrates a tray and a cam shaft having a plurality of cams according to an embodiment. The exemplary configuration shown in FIG. 4 includes the tray 200 from FIG. 3. A camshaft 210 is aligned with the opening 202 (FIG. 3) in the tray 200. FIG. 5 illustrates the configuration shown in FIG. 4 with the tray 200 removed. The camshaft 210 is supported by a mount 220, which can be removably coupled to a robotic mechanism (not shown). The cam shaft 210 includes a plurality of cams. In the exemplary configuration shown in FIG. 5, there are two subsets of cams within the plurality of cams. The first subset of cams 212 is configured and aligned to simultaneously raise all even numbered optical discs (not shown) loaded in the tray 200, and the second subset of cams 214 is configured and aligned to simultaneously raise all odd numbered optical discs (not shown) loaded in the tray 200. Specifically, the cam shaft 210 is positioned under the tray 200 such that each of the first subset of cams 212 is aligned with a corresponding one of the even numbered optical discs and each of the second subset of cams 214 is aligned with a corresponding one of the odd numbered optical discs. If one of the even numbered of optical discs is to be removed from the tray 200, the cam shaft 210 is rotated in a first direction, such as clockwise, thereby engaging the edges of the even numbered optical discs with the first set of cams 212, including the specific optical disc to be removed, through the opening 202 in the tray 200 and raising the even numbered optical discs a predetermined distance. In this manner, the raised even numbered optical discs protrude from the odd numbered optical discs loaded in the tray 200, thereby enabling the robotic gripper to grip the protruding portion of the raised specific optical disc to be removed. Once the raised specific optical disc is removed from the tray 200 by the robotic gripper, the cam shaft 210 is rotated in a second direction, such as counter-clockwise, to its original position thereby lowering the even numbered optical discs back into the tray 200. If one of the odd numbered of optical discs is to be removed from the tray 200, the cam shaft 210 is rotated in the second direction, such as counter-clockwise, thereby engaging the edges of the odd numbered optical discs with the second set of cams 214, including the specific optical disc to be removed, through the opening 202 in the tray 200 and raising the odd numbered optical discs the predetermined distance. For example, if the first and second sets of cams are positioned 180 degrees from each other on the cam shaft, then a 90 degree rotation clockwise can rotate the first set of cams to lift the even numbered optical discs while a 90 degree rotation counter-clockwise can rotate the second set of cams to lift the odd number optical discs.

Although the exemplary embodiment shown in FIGS. 4-5 shows a single cam shaft having two subsets of cams, it is understood that more than one cam shaft can be used. Each cam shaft can have a single set of cam or two subsets of cams. Each cam shaft is aligned with its own corresponding opening in the tray bottom. Each set or subset of cams can be numbered and aligned with every Nth numbered optical disc in the optical disc stack. For example, a configuration having sets or subsets of cams can be used where a set or subset of cams is configured to raise every third optical disc starting with the first optical disc in the optical disc stack, a second set or subset of cams is configured to raise every third optical disc starting with the second optical disc and a third set or subset of cams is configured to raise every third optical disc starting with the third optical disc. It is understood that the number of openings in the tray bottom, the number of cam shafts and the number of subsets of cams on each cam shaft can be configured to selectively raise any subset of optical discs from the remaining optical discs in the optical disc stack.

In some embodiments, the lifting mechanism comprises a finger, or probe, coupled to a linear stage that moves laterally back and forth in the Y direction to be selectively positioned under a specific optical disc. Once positioned under the specific optical disc, the probe is raised from its original Z position in the Z direction, thereby engaging the specific optical disc edge through the opening in the tray and raising the specific optical disc a predetermined distance, such as 0.1 inches. The linear portions of the lead ins, such as at area 122 in FIG. 1, enable the raised specific optical disc to remain stable and aligned in the tray while in the raised position. In this manner, the raised specific optical disc protrudes from the remaining optical discs loaded in the tray, thereby enabling the robotic gripper to grip the protruding portion of the raised specific optical disc. Once the raised specific optical disc is removed from the tray by the robotic gripper, the probe is lowered in the Z direction to its original Z position.

In some embodiments, the lifting mechanism comprises a plurality of comb-like structures. Each comb-like structure includes a plurality of rigid bristles. In an exemplary, there are two comb-like structures. The first comb-like structure is configured and aligned to simultaneously raise all even numbered optical discs loaded in the tray, and the second comb-like structure is configured and aligned to simultaneously raise all odd numbered optical discs loaded in the tray. Specifically, the first comb-like structure is positioned under the tray such that each of a first plurality of rigid bristles is aligned with a corresponding one of the even numbered optical discs. The second comb-like structure is positioned under the tray such that each of a second plurality of rigid bristles is aligned with a corresponding one of the odd numbered optical discs. If one of the even numbered of optical discs is to be removed from the tray, the first comb-like structure is raised in the Z direction, thereby engaging the edges of the even numbered optical discs, including the specific optical disc to be removed, through the opening in the tray and raising the even numbered optical discs a predetermined distance. In this manner, the raised even numbered optical discs protrude from the odd numbered optical discs loaded in the tray, thereby enabling the robotic gripper to grip the protruding portion of the raised specific optical disc to be removed. Once the raised specific optical disc is removed from the tray by the robotic gripper, the first comb-like structure is lowered in the Z direction to its original Z position. The second comb-like structure can be similarly operated as the first comb-like structure to raise the odd-numbered optical discs in the tray.

Although the exemplary embodiment described above includes two comb-like structures, it is understood that more than two comb-like structures can be used. Each comb-like structure can be configured to include a plurality of rigid bristles numbered and aligned with every Nth numbered optical disc in the optical disc stack. For example, a configuration having three comb-like structures can be used where a first comb-like structure includes a first plurality of rigid bristles configured to raise every third optical disc starting with the first optical disc in the optical disc stack, a second comb-like structure includes a second plurality of rigid bristles configured to raise every third optical disc starting with the second optical disc and a third comb-like structure includes a third plurality of rigid bristles configured to raise every third optical disc starting with the third optical disc. It is understood that the number of openings in the tray bottom, the number of comb-like structures and the number of rigid bristles on each comb-like structure can be configured to selectively raise any subset of optical discs from the remaining optical discs in the optical disc stack.

The present application has been described in terms of specific embodiments incorporating details to facilitate the understanding of the principles of construction and operation of the method and system. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. An optical disc storage device comprising:
   a. a tray configured to store a plurality of optical discs, wherein the tray comprises an exterior housing having an opening exposing an interior recess, the recess having a bottom surface and opposing side surfaces configured to support the plurality of optical discs on edge such that a top portion of all of the plurality of optical discs simultaneously extend outside the housing through the opening while a bottom edge of all the plurality of optical discs rest against the bottom surface while in a stored position, further wherein the bottom surface and a portion of the side surfaces form a cylindrical interior surface and a remaining portion of the side surfaces form a linear interior surface coupled to the cylindrical interior surface; and
   b. a plurality of lead ins extending from the bottom surface and opposing side surfaces, wherein the plurality of lead ins form a plurality of grooves, each groove configured to receive one optical disc.

2. The optical disc storage device of claim 1 wherein each lead in matches a contour of an interior surface of the side surfaces and the bottom surface such that the lead in has a cylindrical contour coincident with the cylindrical interior surface and has a linear contour coincident with the linear interior surface.

3. An optical disc storage and retrieval system comprising:
   a. a plurality of optical discs;
   b. a tray configured to store the plurality of optical discs, wherein the tray comprises an exterior housing having an opening exposing an interior recess, the recess having a bottom surface and opposing side surfaces configured to support the plurality of optical discs on edge such that a top portion of all of the plurality of optical discs simultaneously extend outside the housing through the opening while a bottom edge of all the plurality of optical discs rest against the bottom surface while in a stored position, further wherein the bottom surface comprises one or more bottom surface openings thereby exposing a portion of the bottom edge of each of the stored plurality of optical discs; and
   c. a lifting mechanism positioned adjacent to the one or more bottom surface openings, wherein the lifting mechanism is configured to simultaneously and selectively lift a subset of the plurality of optical discs into a retrieval position such that the top portion of each optical disc in the retrieval position protrudes from the top portion of each optical disc remaining in the stored position.

4. The system of claim 3 wherein the subset of the optical discs comprises one or more non-sequential optical discs in the array.

5. The system of claim 3 wherein the subset of optical discs comprises every even numbered optical disc in the array or every odd numbered optical disc in the array.

6. The system of claim 3 wherein the subset of optical discs comprises every Nth numbered optical disc in the array, where N is one of an integer greater than one.

7. The system of claim 3 wherein the recess comprises one or more cylindrical recesses, each cylindrical recess having bottom surface and opposing side surfaces configured to support multiple optical discs on edge.

8. The system of claim 3 wherein the recess comprises a plurality of grooves, each groove structured to receive an optical disc on edge.

9. The system of claim 8 wherein the recess further comprises a plurality of lead-ins extending from the bottom surface and opposing side surfaces, wherein the plurality of grooves are formed by the plurality of lead-ins.

10. The system of claim 3 wherein the lifting mechanism comprises a cam shaft having a plurality of cams, each cam configured to align with one of the optical discs.

11. The system of claim 10 wherein the cam shaft comprises two sets of cams, a first set of cams wherein each cam in the first set is configured to align with every even numbered optical disc in the array and a second set of cams wherein each cam in the second set is configured to align with every odd numbered optical disc in the array, wherein the lifting mechanism selecting engages either the first set of cams or the second set of cams.

12. The system of claim 3 further comprising a robotic gripper configured to selectively grab one of the lifted subset of optical discs in the retrieval position.

13. The system of claim 3 wherein the subset of the optical discs comprises multiple non-sequential optical discs in the array.

* * * * *